April 25, 1967  W. W. COCHRAN  3,315,641

PORTABLE AUTOMATIC FEED BIN

Filed Oct. 23, 1965

INVENTOR.
WALDO W. COCHRAN
BY
Roman A. DiMeo
ATTORNEY 3,315,641
PORTABLE AUTOMATIC FEED BIN
Waldo W. Cochran, 4668 N. Maxson,
El Monte, Calif. 91732
Filed Oct. 23, 1965, Ser. No. 503,467
6 Claims. (Cl. 119—53)

This invention relates to animal feeding bins and more particularly to a portable automatic horse feeding bin. It is common knowledge that some animals, particularly horses, will not feed upon hay, grain, or the like which is located on the ground. This is particularly true where the ground is muddy or trampled. In addition, certain vermin and bacteria may be present in the soil which, if consumed by the horse, would be very detrimental because of the possible development of "worms" by the horse. Further, feeding from the ground often causes "sand pockets" to form in the stomach of the animal resulting in extreme pain. Another reason for the refusal of horses to eat the hay or feed which has fallen to the ground is that the ground is often littered with animal wastes.

This problem is compounded by the fact that horse feeding bins currently in use, provide an uncontrolled amount of feed to the bin so that a greater amount of feed is available to fall on the ground and consequently wasted.

The horse feeding bins of the present invention have an additional advantage over existing feed bins in that the feed consumed by the feeding animal is immediately and automatically replenished. Thus, the invention herein not only eliminates expensive waste of animal feed but automatically replenishes, in controlled amounts, the feed which is consumed thereby eliminating the necessity of handling the same.

Accordingly, it is an object of this invention to provide an animal feed bin of extremely simple construction which will dispense a controlled amount of feed or hay.

Another object is to provide an animal feed bin of extremely simple construction which prevents excessive wastage of hay or feed.

Still another object is to provide an animal feed bin of extremely simple construction which automatically replenishes the consumed hay or feed.

Other objects and advantages of the invention herein will become obvious from the following description taken in conjunction with the annexed claims in which:

Figure 1:
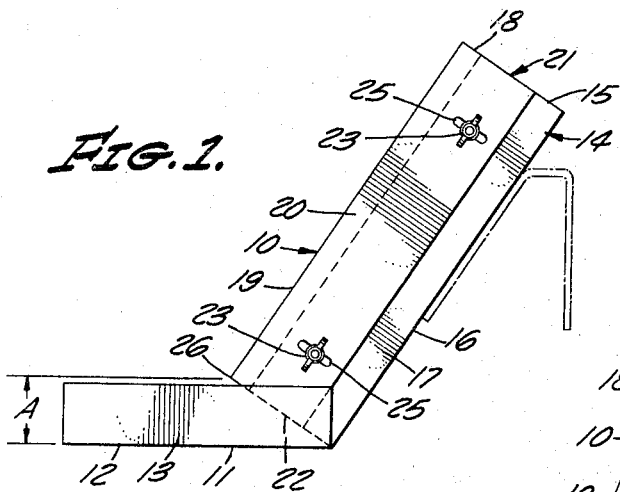
FIG. 1 is a side elevational view of an automatic animal feed bin showing in phantom one means and securing said bin to a fence or wall.
Figure 2:
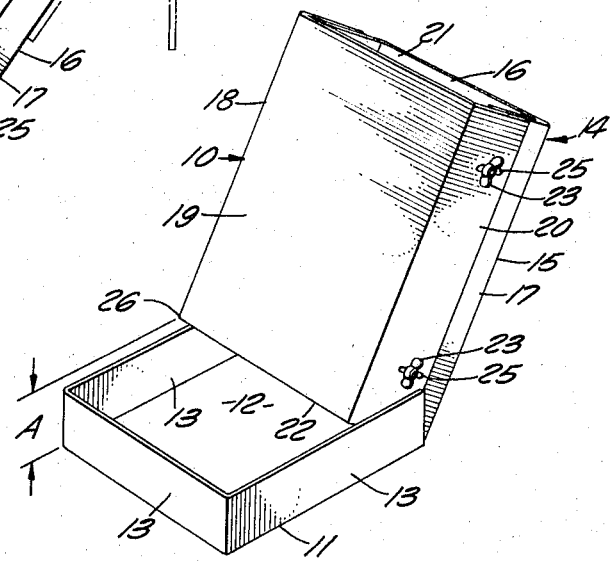
FIG. 2 is a prospective view of the automatic animal feed bin shown in FIG. 1.
Figure 3:
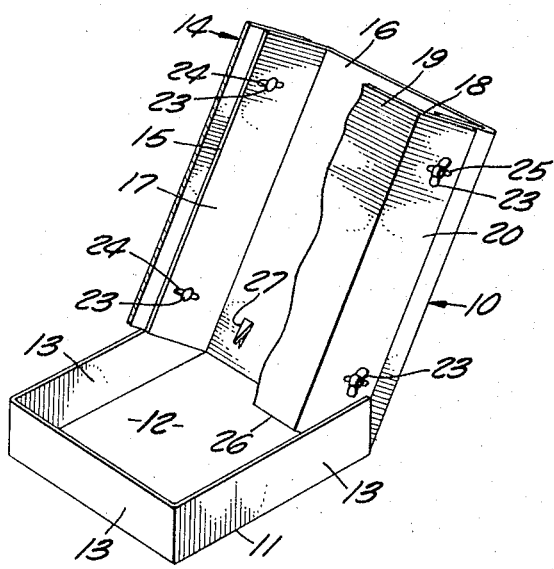
FIG. 3 is a prospective view of the automatic animal feed bin similar to that in FIG. 2 but having the top portion thereof partly in section.

Referring more particularly to FIGS. 1–3, the automatic feed bin of the instant invention, which is generally designated by the reference numeral 10, is comprised of a tray 11 having a bottom face 12 and elevated sides 13 secured thereto and a chute 14 attached in angular relationship to said tray.

Chute 14 is comprised of a lower member 15 having a bottom 16 and elevated sides 17 and an upper member 18 also provided with a bottom 19 and elevated sides 20. The open face of upper member 18 is positioned over the open face of lower member 15 so as to provide a hollow channel having a top opening 21 and a bottom opening 22. Upper member 18 is in adjustable engagement with lower member 15 in a direction normal to the axis thereof and is engaged with said lower member 15 by securing bolts 23, or the like, projecting through superimposed elongated slots 24 and 25 provided by both the lower and upper members, respectively. With this arrangement, chute 14 is adjustable to accommodate one or more "leafs" of hay (each bale of hay consists of 3 "leafs") or larger quantities of other types of feed.

A "leaf" of hay is inserted into upper opening 18 of chute 14 so as to protrude through bottom opening 22 of said chute 14. It will be noted that only a predetermined or controlled amount of the end of the leaf is exposed for consumption by the horse. Thus the horse can insert its muzzle only in the opening 22 defined by the upper lip 26 of the upper member 18 of chute 14 and the bottom 12 of tray 11 as designated by the letter A.

As the protruding end of the leaf of hay is consumed by the horse, the leaf feeds downwardly in chute 14 thereof, automatically replenishing the hay consumed. It is obvious that the chute length is limited only by practical design requirements and can be made of any length without deviating from the principles of this invention so that the feed may be continuously provided at bottom opening 22. To eliminate the possibility of the hay "leaf" being pushed upwardly away from bottom opening 22 by the horse's muzzle, projections 27 are provided extending outwardly and slightly downwardly from bottom 16 of lower member 15 of chute 14. Projections 27 permit downward movement of the hay "leaf" but resist any upward movement thereof by biting into the hay.

Although it has been found that the best results are obtained when chute 14 is angled approximately 35° from the vertical with respect to tray 11, the chute may still function when disposed at any angle relative thereto, except that when the chute approaches the 90° position relative to tray 11, the amount of hay exposed to the horse is correspondingly diminished. Further, as the chute approaches the 0° position, the effectiveness of the automatic feed feature of the invention diminishes.

Because of the simplicity, compactness and lightweight of the automatic feed bin described in FIGS. 1–3, the device can be easily transported from place to place. It can be supported by a tripod, or the like (not shown), or suspended from a post, fence or wall by brackets (as shown by a dot dash line in FIG. 1).

Figure 4:
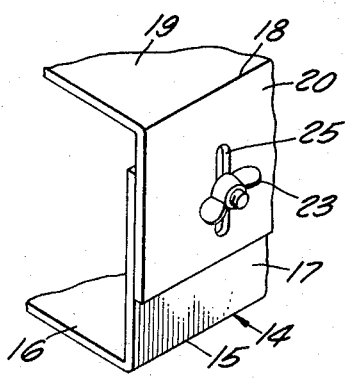
FIG. 4 is a fragmentary view of a corner of the top portion of the automatic animal feed bin shown in FIGS. 2 and 3.

FIG. 4 is a fragmentary view of a corner of chute 14 of the device of FIGS. 1–3 better showing the adjustable feature of the upper member 18 relative to lower member 15. As illustrated, securing bolt 23 passes through elongated slot 25 of upper member 18 and through slot 24 (not visible) provided by lower member 15. To contract or expand the size of the hollow channel of chute 14, the securing bolts 23 are loosened and the upper member 18 is adjusted to the desired position relative to lower member 15. Securing bolts 23 are then tightened to maintain upper member 18 in the new desired position. It should be noted that although chute 14 is shown in FIGS. 1–3 as being rigidly secured to tray 11, said chute may be pivotly attached to the tray so that the chute can be folded downwardly into the tray thereby reducing the space required to store the same, particularly when the feed bin is being transported to another location.

By the foregoing, there has been disclosed a horse feed bin which is of extremely simple construction, yet provides a very effective means for controlling the amount of feed available to a horse and automatically replenishes the consumed feed thereby eliminating feed handling and preventing waste thereof.

While one embodiment of the invention is described, it is of course understood that the particular embodiment of the invention herein disclosed is for illustrative purposes only, and that various changes may be made therein without departing from the principles of the invention or the scope of the annexed claims.

I claim:
1. An automatic feed bin for dispensing hay or the like, comprising:
   a tray, said tray having the outer edges thereof located in a plane elevated relative to the bottom face of said tray; and
   an enclosed, substantially rectangular chute attached to said tray in angular relationship therewith, said chute having one end thereof disposed so as to open onto said tray, said chute being attached to said tray so that the axis thereof is at an acute angle relative to the tray, one side of said chute being adjustable in a direction normal to the axis of the chute; and
   outwardly and downwardly projecting means provided on the internal surface of the chute for gripping hay or the like.

2. An automatic feed bin as described in claim 1 wherein said chute is attached to one end of said tray and is positioned so that the axis thereof is at an angle of 35° relative to the tray.

3. An automatic feed bin as described in claim 1 wherein said chute is attached to one end of said tray and has an open upper end for receiving hay or the like.

4. An automatic feed bin as described in claim 1 wherein said chute is attached to one end of said tray and has an open upper end for receiving hay or the like, and wherein the upper edge of the chute end which is disposed so as to open onto said tray is positioned at a predetermined distance from the bottom face of said tray so as to permit a controlled amount of hay or the like, being dispensed therefrom.

5. An automatic feed bin as described in claim 1 wherein said gripping means are comprised of outwardly and downwardly extending finger projections.

6. An automatic feed bin as described in claim 1 wherein the chute end which opens onto the tray overlies said tray so as to expose a maximum amount of chute opening.

References Cited by the Examiner

UNITED STATES PATENTS

| | | | |
|---|---|---|---|
| 258,838 | 5/1882 | Willson | 119—53 |
| 436,112 | 9/1890 | Atkinson | 119—58 |

SAMUEL KOREN, *Primary Examiner.*

HUGH R. CHAMBLEE, *Examiner.*